(12) United States Patent
Donovan et al.

(10) Patent No.: US 8,156,054 B2
(45) Date of Patent: Apr. 10, 2012

(54) SYSTEMS AND METHODS FOR MANAGING INTERACTIONS BETWEEN AN INDIVIDUAL AND AN ENTITY

(75) Inventors: John Donovan, San Antonio, TX (US); James C. Bedingfield, Sr., Lilburg, GA (US); Barbara Roden, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 749 days.

(21) Appl. No.: 12/328,569

(22) Filed: Dec. 4, 2008

(65) Prior Publication Data

US 2010/0145890 A1   Jun. 10, 2010

(51) Int. Cl.
*G06F 15/18* (2006.01)
*G06N 5/04* (2006.01)

(52) U.S. Cl. .............. 706/12; 706/46; 382/224
(58) Field of Classification Search .......... 706/11, 706/520; 345/156; 709/206
See application file for complete search history.

(56) References Cited

U.S. PATENT DOCUMENTS

| | | | |
|---|---|---|---|
| 6,757,722 | B2 | 6/2004 | Lonnfors et al. |
| 6,791,583 | B2 | 9/2004 | Tang et al. |
| 2004/0037396 | A1 | 2/2004 | Gray et al. |
| 2005/0289470 | A1 | 12/2005 | Pabla et al. |
| 2009/0055484 | A1* | 2/2009 | Vuong et al. ............... 709/206 |
| 2009/0309891 | A1* | 12/2009 | Karkanias et al. ........... 345/581 |

OTHER PUBLICATIONS

Patent Cooperation Treaty, "International Search Report and Written Opinion", ISA/US, by Officer Lee W. Young in PCT Application No. PCT/US09/66012; Document of 11 pages dated Jul. 26, 2010.

* cited by examiner

*Primary Examiner* — Jeffrey A Gaffin
*Assistant Examiner* — Ola Olude Afolabi
(74) *Attorney, Agent, or Firm* — Guntin Meles & Gust, PLC; Ed Guntin

(57) ABSTRACT

A system that incorporates teachings of the present disclosure may include, for example, a synthesis engine having a controller, and a storage medium for storing instructions to be executed by the controller. The instructions, when executed by the controller, can cause the controller to retrieve collected information associated with a behavior of an individual, synthesize from the information a measure of a mood of the individual to interact with others, and transmit the measure to a system associated with the individual to manage requests between the individual and the entity. The measure of the mood of the individual can indicate an availability of the individual and a receptiveness of the individual to accept a request to interact with an entity. The measure can be described by a plurality of dimensions. Other embodiments are disclosed.

34 Claims, 8 Drawing Sheets

700

SYSTEMS AND METHODS FOR MANAGING INTERACTIONS BETWEEN AN INDIVIDUAL AND AN ENTITY

FIELD OF THE DISCLOSURE

The present disclosure relates generally to communication techniques and more specifically to systems and methods for managing interactions between an individual and an entity.

BACKGROUND

Instant messaging applications such as Microsoft's Windows Messenger™ can provide users a way to track the availability of others to communicate. Windows Messenger™ can for example indicate that a targeted party is online, away from his/her computer, or offline. Presence and location systems can be used in similar applications to provide the whereabouts of an individual, the availability of the individual to communicate, an indication of the state of use of a communication device of the individual, and so on.

DETAILED DESCRIPTION

Figure 1:
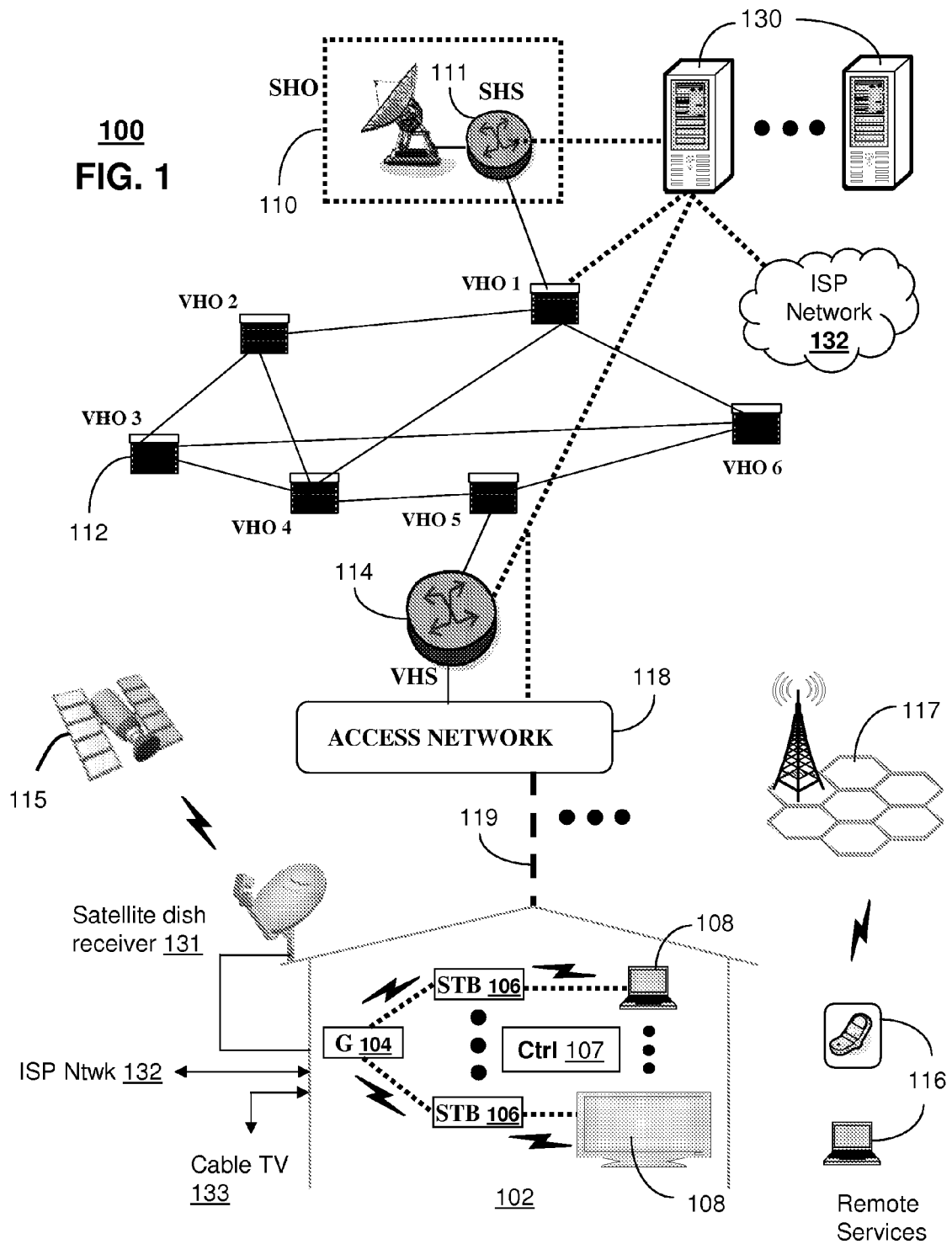
FIGS. 1-2 depict illustrative embodiments of communication systems that provide media services.

One embodiment of the present disclosure can entail a synthesis engine having a controller, and a storage medium for storing instructions to be executed by the controller. The instructions, when executed by the controller, can cause the controller to retrieve collected information associated with a behavior of an individual, synthesize from the information a measure of a mood of the individual to interact with others, and transmit the measure to a system associated with the individual to manage requests between the individual and the entity. The measure of the mood of the individual can indicate an availability of the individual and a receptiveness of the individual to accept a request to interact with an entity. The measure can be described by a plurality of dimensions.

Another embodiment of the present disclosure can entail a negotiation engine including a controller, and a storage medium for storing instructions to be executed by the controller. The instructions, when executed by the controller, can cause the controller to receive a measure of a mood of an individual to interact with others, determine from the measure of the mood of the individual a strategy for negotiating with the party sending the request to interact with the individual, detect the request, and upon receipt of the request, negotiate with the party a degree of access to the individual according to the strategy. The negotiating can include forwarding, to the party, a representation of the measure of the mood of the individual, permitting the party to continue with the request to interact with the individual after receipt of the representation of the measure of the mood, and if the party elects to continue with the request, applying the strategy to determine the degree of access to the individual.

Yet another embodiment of the present disclosure can entail a computer-readable storage medium having computer instructions for receiving a collection of information associated with an individual, synthesizing from the information a measure of a mood of the individual to interact with others, and transmitting the measure to a system associated with the individual to manage requests between the individual and an entity.

Another embodiment of the present disclosure can entail a computer-readable storage medium having computer instructions for receiving a measure of a mood of an individual to interact with an entity, determining from the measure of the mood of the individual a strategy for negotiating with the entity, detecting a request from the entity to interact with the individual, and negotiating with the entity a degree of access to the individual according to the strategy.

Another embodiment of the present disclosure can entail synthesizing from collected information associated with an individual a measure of a mood of the individual to interact with an entity, and transmitting to a system the measure of the mood of the individual to manage requests of an entity to interact with the individual.

Another embodiment of the present disclosure can receiving a measure of a mood of an individual to interact with an entity, generating from the measure of the mood of the individual a strategy for negotiating with the entity, detecting a request from the entity to interact with the individual, and negotiating with the entity a degree of access to the individual according to the strategy.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, a common analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
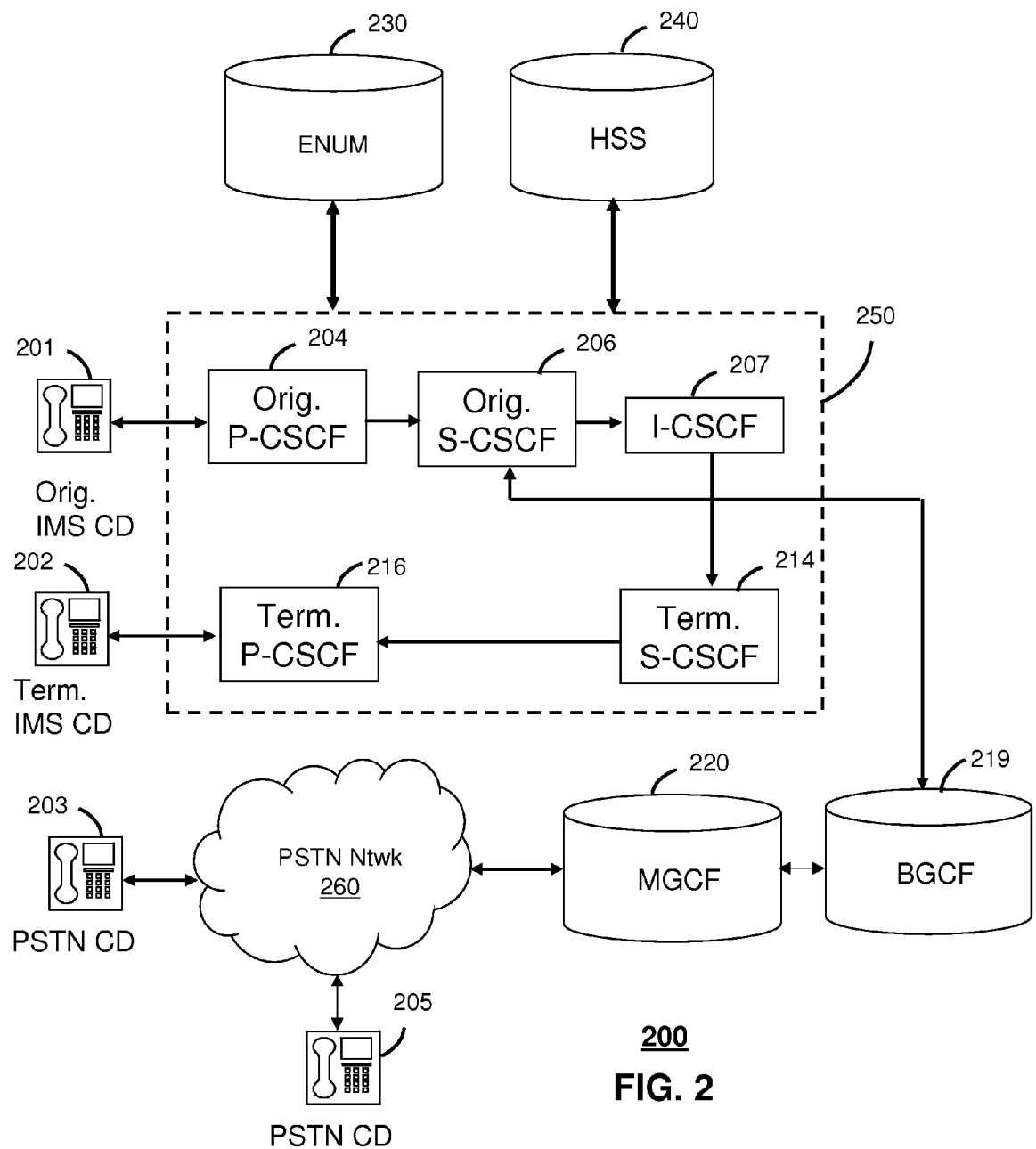

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a E.164 NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM server 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as CD 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as CDs 203 or 205, the ENUM server 230 can respond with an unsuccessful address resolution which can cause the originating S-CSCF 206 to forward the communication request to the MGCF 220 via a Breakout Gateway Control Function (BGCF) 219. The MGCF 220 can then initiate communications with the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
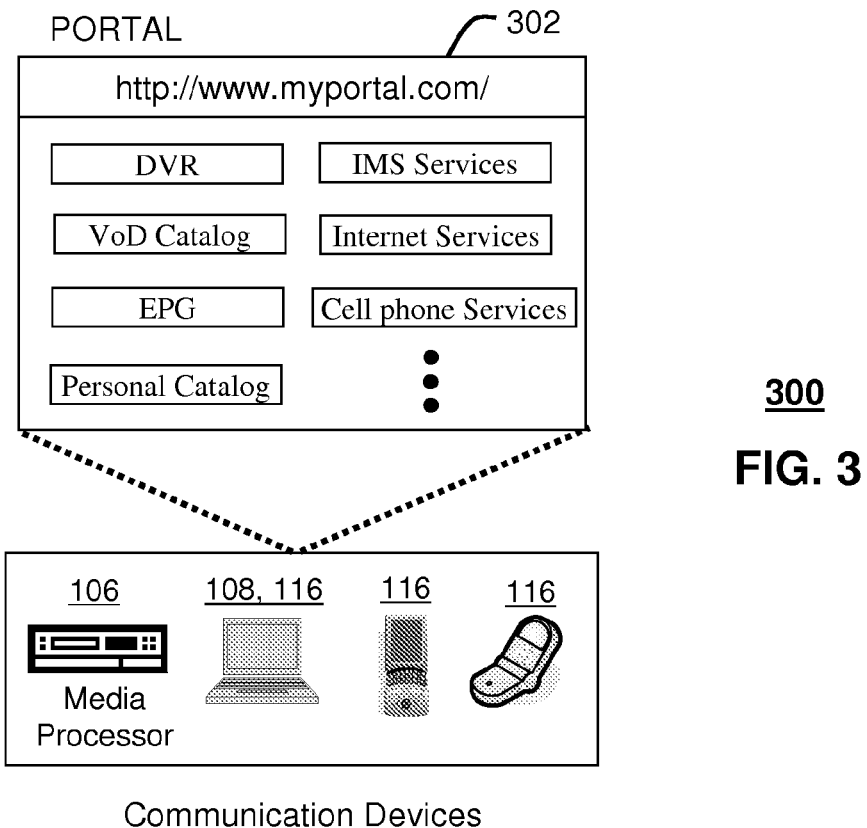
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100, 200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access the media processor 106 and services managed thereby such as a Digital Video Recorder (DVR), a VoD catalog, an EPG, a personal catalog (such as personal videos, pictures, audio recordings, etc.) stored in the media processor 106, provisioning IMS services described earlier, provisioning Internet services, provisioning cellular phone services, and so on.

Figure 4:
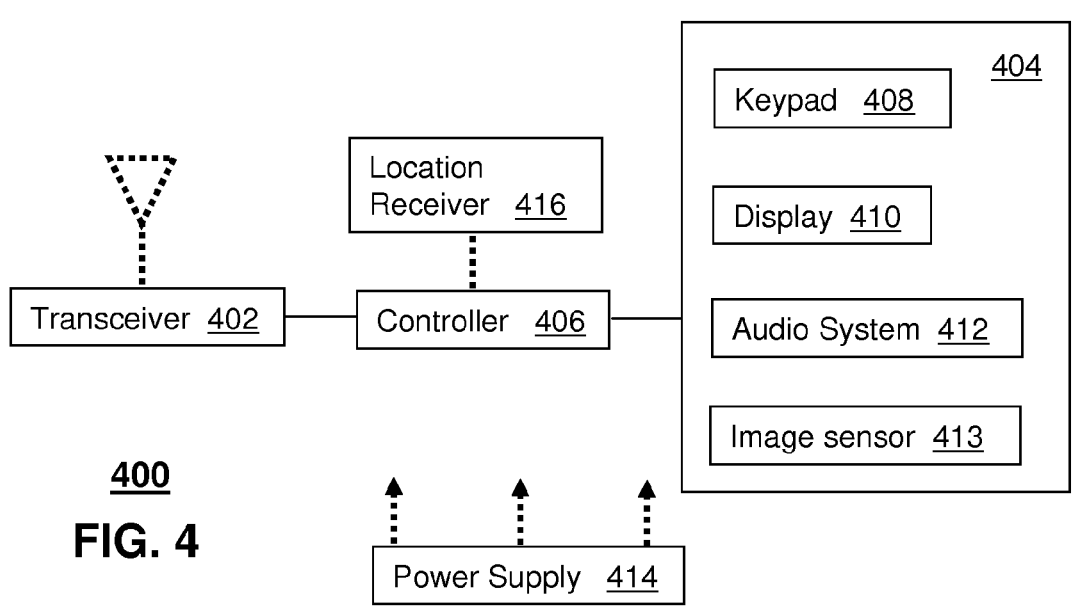
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices 106, 108, 116, 201, 202, 203, and 205 of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing or transmitting still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
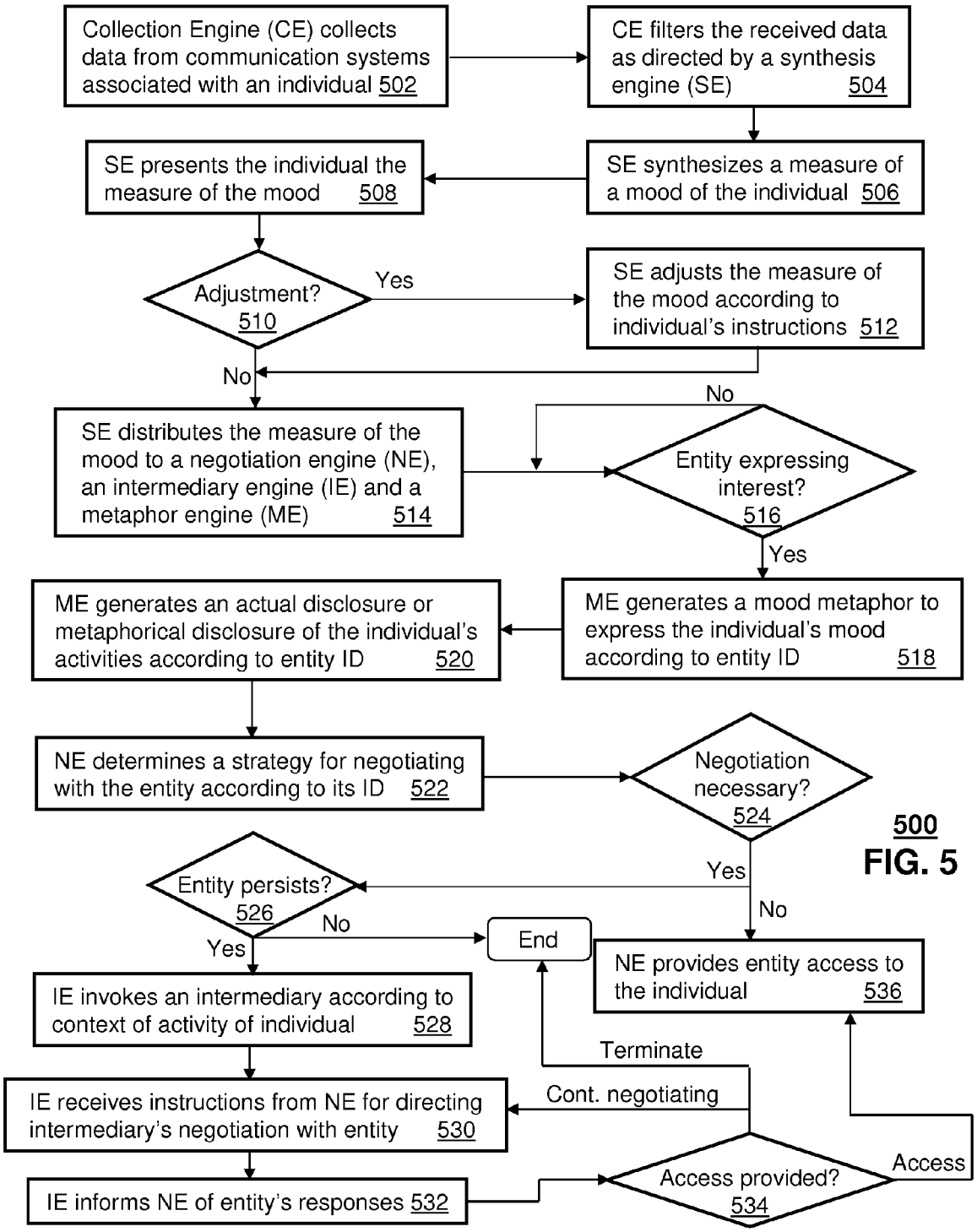
FIG. 5 depicts an illustrative embodiment of a method according to the present disclosure.
Figure 6:
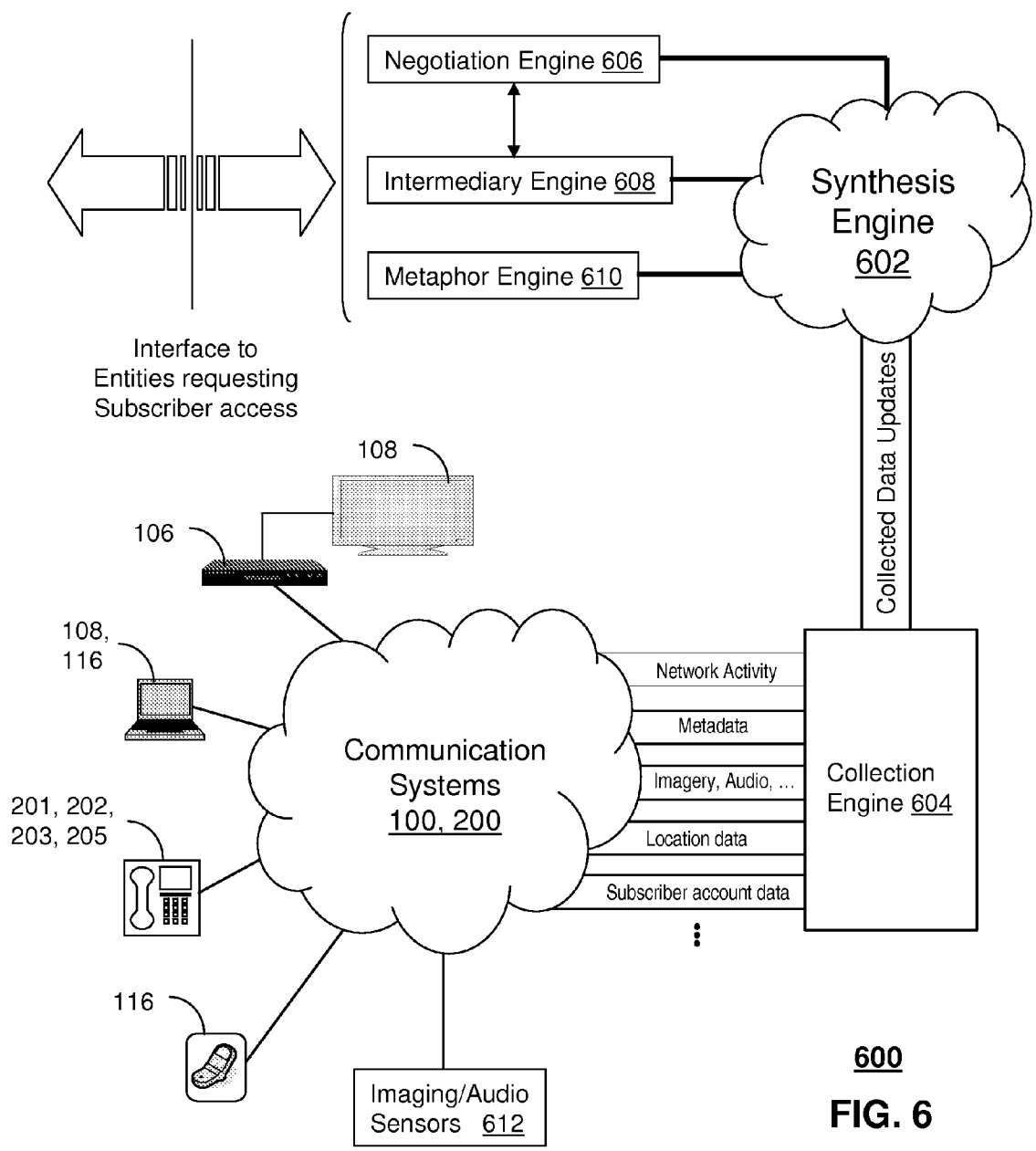
FIG. 6 depicts an illustrative embodiment of a system for managing access to individuals according to the method of FIG. 6.

FIG. 5 depicts an illustrative method 500 that can be applied to a system 600 shown in FIG. 6 that can be overlaid or operably coupled to communication systems 100 and 200 of FIGS. 1-2 as another representative embodiment of these communication systems. System 600 can comprise a synthesis engine 602, a collection engine 604, a negotiation engine 606, an intermediary engine 608, and a metaphor engine 610, each of which can operate from common computing and communication resources such as, for example, a server, mainframe or other suitable computing device with a capability to communicate over an IP, PSTN, or a wireless interface such as those described above. As will be described shortly, system 600 can be used to manage interactions between an individual and entities expressing an interest in interacting with the individual.

Method 500 can begin with step 502 in which the collection engine 604 collects from communication systems 100 and 200 data associated with an individual whose communications and actions are being monitored for the purpose of providing interaction management services such as those described by the present disclosure. To accomplish this step the collection engine 604 can interface to a plurality of network elements such as routers, switches, DSLAMs, billing systems, provisioning systems, or other common network elements of the communication systems 100 and 200. The information collected from these network elements can represent, for example, network activity data, metadata, imagery and audio data, location data, and subscriber account data, each having some association with the individual.

Network activity data can represent communication traffic originating from the individual's use of resources of the communication systems 100 or 200. For example, network activity can arise from the individual's use of the ISP network 132 of FIG. 1 (sending emails, browsing the Internet, engaging in instant messaging, etc.). Network activity can also arise from the individual engaging in voice or data communications over the IMS network 250 or a cellular system such as reference 117, or by the individual's viewing of a movie supplied by a VoD service of the IPTV media system of FIG. 1. Other sources of network activity that can be derived from communication systems 100-200 are contemplated by the present disclosure.

The metadata can be collected by the collection engine 604 from an EPG system of the communication system 100. The metadata can be used to describe media content consumed by the individual (e.g., movie genre, movie title, and so on). Imagery and/or audio data can also be collected by the collection engine 604 from, for example, web cameras located in a home (kitchen, family room, game room, etc.) or business establishment (office, reception area) of the individual. The imagery collected can be still images or video content.

The audio data can be collected from communication devices of the individual (computer, desktop phone, cell phone, etc.) which can be selectively enabled by the collection engine 604 to provide audio-only data. In another embodiment, microphones can be integrated with the web cameras or can be individually located in a number of locations of the individual's home or business to provide audio data to the collection engine 604. The image and/or audio data can be used to describe the environment and activities of the individual. The image and/or audio data can be supplied to the collection engine 604 by the abovementioned devices which can be represented collectively as image/audio sensors 612 of FIG. 6.

The collection engine 604 can also collect location data which can arise from coordinate information (longitude, latitude) supplied by communication devices 116 of the individual with a GPS receiver or from triangulation analysis performed on communication data supplied by network elements of communication systems 100 and 200. Other location data collection methods such as detecting a proximity of communication devices to known WiFi antennae are contemplated by the present disclosure. The collection engine 604 can also receive subscriber account data from billing or provisioning systems operating in the communication systems 100 and 200. The subscriber account data can indicate which services an individual is subscribed to, how much the services are costing the individual, where the individual lives, how many parties are located in the household of the individual, and the individual's payment or credit history.

Given the extensive communications and processing resources of communication systems 100 and 200, it would be apparent to an artisan with ordinary skill in the art that other sources of information associated with the individual can be collected by the collection engine 604. For instance, the communication systems 100 and 200 can provide telemetry data to the collection engine 604. The telemetry data can indicate how often the individual utilizes any one of the above media resources (IPTV media system, cable TV, satellite TV, cellular telephony, PSTN telephony, IMS telephony, Internet resources, and so on). The telemetry information can also indicate which communication devices of the user are powered down, which are powered up, as well as other states of usage of these devices.

The collection engine 604 can receive directives from the synthesis engine 602 to determine which information is to be collected about the individual, how it is to be filtered (if at all) in step 504, and when and in what format the collected information is to be distributed to the synthesis engine 602. To avoid overburdening the synthesis engine 602, the collection engine 604 can be directed by the synthesis engine 602 to identify incremental changes in the collected information and only transmit these changes to the synthesis engine 602. The incremental changes can be supplied to the synthesis engine 602 as collected data updates as shown in FIG. 6. The synthesis engine 602 can also apply degrees of importance (such as weighting factors) to aspects of the collected information described above to manage the extent and priority given to the collected data processed by the synthesis engine 602.

In step 506, the synthesis engine 602 can synthesize a measure of a mood of the individual from the collected data updates provided by the collection engine 602 as described above. The measure of the mood can for example indicate an availability and receptiveness of the individual to interact with another entity. In the present context the term entity can mean a human being (such as friends or family of the individual) or an artificial intelligence system such as a gaming system, social networking system, or other system requesting an interaction with the individual. To synthesize the measure of the mood of the individual, the synthesis engine 602 can be programmed to determine from the collected data updates a context of activity of the individual, a location of the individual, a state of usage of the communication devices or computing devices of the individual, and a behavioral profile of the individual.

The context of activity of the individual can be determined in several ways. For example, aspects of the network activity can indicate to the synthesis engine 602 that the individual is watching a television program at home, is working at his/her computer in the office, is neither at home or in the office, or is on a business trip. Lack of network activity on the other hand can indicate a state of rest for the individual. The metadata collected from media content consumed by the individual can also be used to identify what the individual is watching on television (VoD movie, documentary, football game, etc.). The location data can indicate that the user is at home, in the office, driving in an automobile, traveling on a train, sitting at a restaurant or a movie theater, etc.

Collectively, the above information can be used by the synthesis engine 602 to determine a context of activity of the individual. The synthesis engine 602 can, for example, categorize the individual's activity as an entertainment context, an occupational context, or a privacy context. An entertainment content can arise when the individual is at home watching a football game with friends and family. An occupational context can arise, for example, when the individual is at the office, and is engaged in a conference call. A privacy context can arise when the individual is resting in bed or has proactively submitted a request to system 600 for a quiet moment. Other possible forms of contextual identification are contemplated by the present disclosure.

The synthesis engine 602 can also historically track the context of activity of the individual, the location of the individual, and the state of usage of communication and computing devices of the individual. Utilizing common statistical pattern recognition tools, the synthesis engine 602 can detect historical patterns that can indicate the habits and customs of the individual. The synthesis engine 602 can for example determine that upon arriving at home from a typical work day, the individual turns on the TV to the ESPN channel. The synthesis engine 602 can also identify from metadata that the individual is particularly interested in certain sports teams. Behavioral information such as this can be saved by the synthesis engine 602 in a behavioral profile. Generally speaking, the behavioral profile of the individual can describe the habits and customs of the individual during a work week and on weekends. The customs and habits recorded in the profile can include for example who the individual commonly communicates with, an identification of common media content consumed by the individual, which communication and computing devices the individual uses at different times of the day, likes and dislikes of the individual, and so forth.

The behavior profile can be comprehensive in its descriptions of the individual. For example, the individual's behavior on a particular day can be described in time intervals: a first interval starting from the time the individual wakes up, a second interval starting from the time the individual arrives at his/her office, a third interval starting from the time the individual returns home from work, and a fourth interval starting at the time the individual goes to sleep. Each of these intervals can be described in temporal units (every half hour, every hour, etc.).

The behavioral profile of the individual can also be refined with subscriber account data. The subscriber account data of the individual combined with a knowledge of the media consumption behavior of the individual can provide the synthesis engine 602 sufficient information to demographically and psychographically profile the individual. The behavioral profile can therefore identify demographic aspects of the individual such as age group, gender, income level and education, and psychographic aspects such as traits of the individual, likes and dislikes of the individual, attitudes of the individual, interests of the individual, and lifestyle of the individual.

The synthesis engine 602 can determine the measure of the mood of the individual singly or in combination from the context of activity of the individual, the location of individual, the state of usage of communication and computing devices of the individual, and the behavioral profile of the individual. The resulting measure can be described in a plurality of dimensions as shown in FIG. 7.

Figure 7:
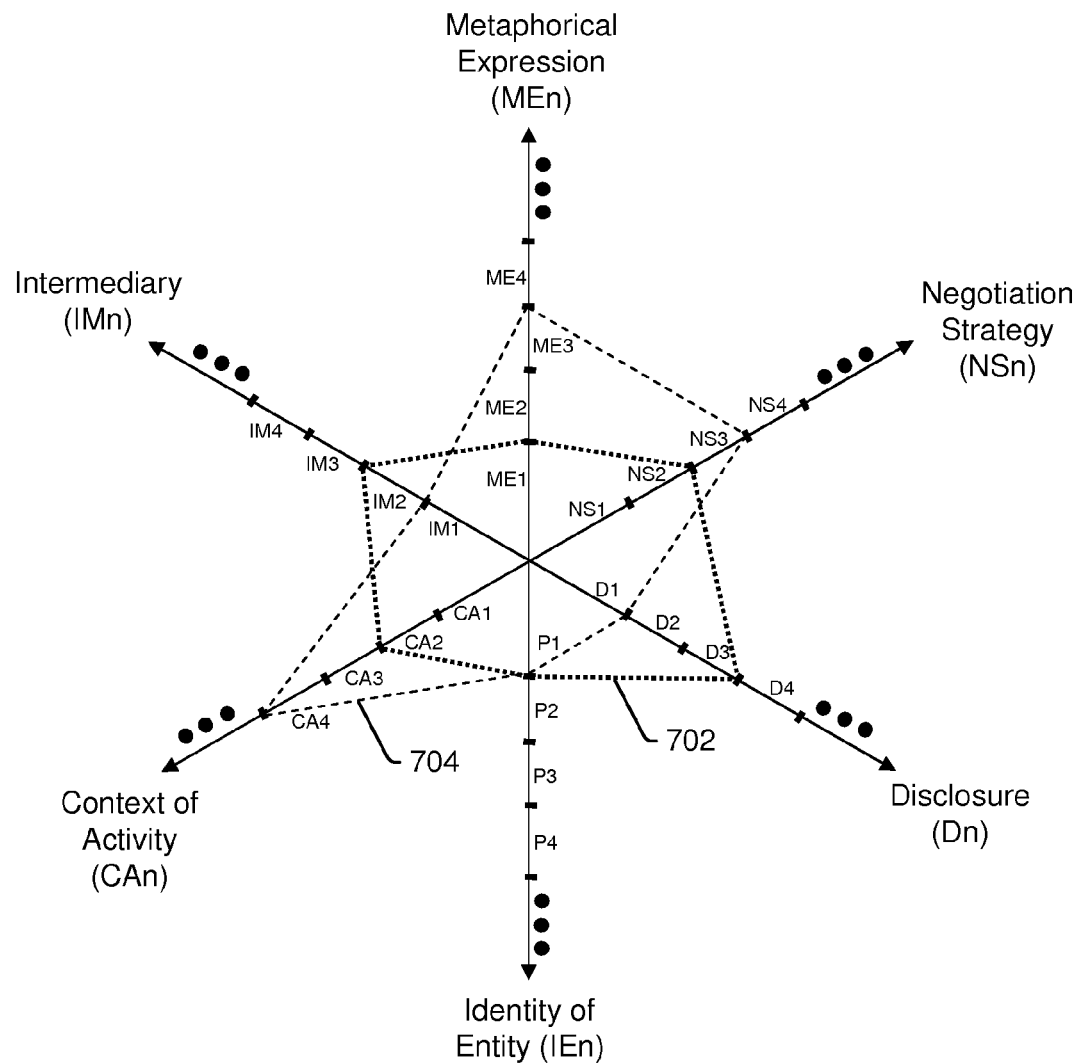
FIG. 7 depicts an illustrative embodiment of a multidimensional representation of an individual's mood according to the method of FIG. 6.

The illustration in FIG. 7 is a planar representation of six possible dimensions for describing the mood of the individual: (1) a first dimension to manage a metaphorical expression of the mood of the individual to interact with an entity (MEn), (2) a second dimension to manage a disclosure to the entity of one or more activities of the individual (Dn), (3) a third dimension to manage a negotiation with the entity to provide the entity a degree of access to the individual (NSn), (4) a fourth dimension to manage an intermediary that conducts the negotiation with the entity (IMn), (5) a fifth dimension to manage the first through fourth dimensions according to an identity of the entity requesting to interact with the individual (IEn), and (6) a sixth dimension to manage the first through fourth dimensions according to a context of activity of the individual at the time the entity requests an interaction with the individual (CAn).

For illustration purposes only, the entity will be referred to herein as a party expressing an interest to interact with the individual. It is understood however that the party can be replaced with an artificial intelligence system without affecting the scope of the disclosure that follows.

The first dimension can be subdivided into elements, each identifying a plurality of metaphor expressions (ME1 through MEn) which can be used to express the mood of the individual to interact with a party. The second dimension can identify a plurality of techniques to disclose the activities of the individual (D1 through Dn) to the party. The elements of the third dimension can identify a plurality of negotiation strategies (NS1 through NSn) to provide the party a degree of access to the individual. The elements of the fourth dimension can identify a plurality of intermediaries (IM1 through IMn) that can be called on to negotiate with the party the degree of access to the individual. The elements of the fifth and sixth dimensions can identify a plurality of parties (P1 through Pn) and context of activities of the individual (CA1 through CAn) which the synthesis engine 602 can use to create a plurality of multidimensional scenarios depicted illustratively by references 702 and 704. These scenarios can be used by the negotiation engine 606, the intermediary engine 608, and the metaphor engine 610 to perform their respective functions.

For illustration purposes, suppose that party P1 corresponds to Sam Doe (a friend of the individual). The scenario of reference 702 shows that when the context of activity of the individual is CA2 and the requesting party is Sam Doe (P1), the intermediary engine 608 is directed by the synthesis engine 602 to select the intermediary IM2, the metaphor engine 610 is to directed to select the metaphor expression ME1, the negotiation engine 606 is to directed to select the negotiation strategy NS2, and the metaphor engine 610 is directed to select a disclosure technique D3.

The context of activity CA2 can represent an occupational context of the individual such as when the individual is busy at work, on the phone, or drafting documents on his/her computer. Intermediary IM2 can represent the selection of an interactive avatar presented to the party prior to providing communication access to the individual. The metaphor expression ME1 can represent a metaphor expression such as a partially opened door to indicate the availability and receptiveness of the individual to interact with the party.

The disclosure D3 can identify an actual or metaphorical disclosure that reveals in whole or in part the activities of the individual. An actual disclosure can be represented by a visual or audible presentation of the activities of the individual supplied by data from a web camera and/or audio sensor 612 collected by the collection engine 604 which can be transmitted to the metaphor engine 610. A metaphorical disclosure of the individual's activities on the other hand can be represented by a virtual depiction of the individual's activities which can be presented to the party in a visual and/or audible format (e.g., a picture of an animated figure working from an office with a partially opened door, or the sound of a door opening partially with keyboard strokes heard in the background).

The negotiation strategy NS2 can define a negotiation interaction with the party. The negotiation interaction can be described by flowcharts generated by the synthesis engine 602 which outline queries directed to the party and actions to be taken by the negotiation engine 606 according to the party's responses to the queries. Negotiation interactions can also be described by artificial intelligence algorithms capable of addressing complex communication exchanges with the party which can address open-ended discussions that are not as straightforward as a static flowchart.

Reference 704 illustrates another scenario identified by the synthesis engine 602 when the context of activity of the individual changes from CA2 to CA4 for the same party (Sam Doe). The transition from reference 702 to 704, results in a change of the intermediary from IM2 to IM1, a change of the metaphor expression from ME1 to ME3, a change of the negotiation strategy from NS2 to NS3, and a change of the disclosure technique from D3 to D1. Many other scenarios (which are not shown) can be generated by the synthesis engine 602 from the multidimensional chart of FIG. 7. Each of these scenarios can be communicated in whole or in part to the negotiation engine 606, the intermediary engine 608 and the metaphor engine 610 as a multidimensional description of the mood of the individual at any particular time and day of the week.

Once a measure of the mood of the individual has been determined in step 506, the synthesis engine 602 can present in step 508 the results to the individual on a communication device of the individual such as his/her computer. The presentation can be a graphical representation such as shown in FIG. 7. To manage the presentation, the synthesis engine 602 can be directed by the individual to present one scenario at a time on a per party basis. When there are too many scenarios to review, the individual can focus his/her attention on a few parties of interest (such as family, management, executive staff). During the presentation of a particular scenario, the individual can qualitatively adjust each scenario by selecting a portion of a reference line with a navigation device such as a mouse, and moving it between elements for any of the dimensions shown in FIG. 7.

For example, in the case of reference 702, the individual can move the line intersection from intermediary IM2 to intermediary IM3, and disclosure D3 to disclosure D1, while retaining the previous intersections at the metaphorical expression ME1 and negotiation strategy NS2. Alternatively, the individual can submit quantitative changes to the displayed scenario by way of a keyboard entry ("Change IM2 to IM3, and D3 to D1").

It will be appreciated by an artisan with ordinary skill in the art that other methods can be used by the individual for qualitatively or quantitatively updating the scenarios presented by the synthesis engine 602. For instance, the synthesis engine 602 can use common graphical tools such as "sliders" or "knobs" to provide the individual a means to make updates. Each dimension shown in FIG. 7 can be presented with a corresponding slider or knob that the individual can use to change between elements of a proposed scenario.

The individual can also be presented with an additional slider or knob that represents a collective measure of multiple dimensions. The slider or knob in this instance can signify discrete levels or a continuous range of a receptiveness of the individual to interact with others or with a particular entity. Moving the slider to the left or turning the knob counterclockwise can represent a decrease in the receptiveness of the individual to interact, while moving the slider to the right or the knob clockwise can represent an increase in the receptiveness to interact. The synthesis engine 602 can present the slider or knob in a position that corresponds to the scenario being presented. A departure from this position can change the cross points shown in FIG. 7 for a particular scenario (or multiple scenarios). The synthesis engine 602 can graphically show the adaptation of a scenario (or scenarios) as the individual moves the slider or knob.

In addition to the chart of FIG. 7, the synthesis engine 602 can also provide statistical data for each scenario as well as for a collection of scenarios. The statistical data can be presented graphically such as by way of a probability distribution (Gaussian, Poisson) with standard deviation, variance, and confidence metrics. For individuals who have less technical expertise, the synthesis engine 602 can apply color coding techniques to a statistical graph to indicate mood interpretations of the individual. For example, the color green can represent a receptive mood of the individual to interact with others while red represents an unreceptive mood. Sliders and knobs can be presented with these representations so that the individual can also adjust statistical predications of the mood of the individual on a scenario basis, or across a collection of scenarios.

Independent of the method used by the individual, the qualitative or quantitative changes to the measure of the mood of the individual can be detected by the synthesis engine 602 in step 510 and updated in step 512.

In step 514, the synthesis engine 602 can distribute in whole or in part the updated multidimensional measure of the mood of the individual to the negotiation engine 606, the intermediary engine 608 and the metaphor engine 610. The multidimensional measure can be distributed as digital codes each representing scenarios synthesized by the synthesis engine 602. In step 516, the negotiation engine 606 and the metaphor engine 610 can monitor parties expressing an interest in interacting with the individual.

Step 516 can be accomplished by the negotiation engine 606 and/or the metaphor engine 610 detecting communication origination signals initiated by communication or computing devices of a party (such as the media processor 106 or CDs 108, 116, 201, or 203), each of these devices of the party communicatively coupled to communication systems 100 and 200. A communication original signal can arise from a PSTN call causing the generation of SS7 signaling information, a VoIP call causing the generation of a SIP INVITE, or an instant messaging request arising from an IM application operating from a computer of the party. The communication origination signals can be directed by network elements of communication systems 100 and 200 to the negotiation engine 606 and the metaphor engine 610 before it reaches a CD of the individual such as CD 202. The network elements can await instructions from the negotiation engine 606 which determines the degree of access provided to the individual.

In another embodiment, step 516 can represent an intermediate communication attempt by a party. For example, a party exploring the possibility of interacting with the individual can submit a request to communicate with the metaphor engine 610 in steps 518 and 520 to determine from a metaphor expression and/or the disclosure of the individual's activities whether interaction with the individual is desirable. If the party determines that an interaction is desirable, the party can cause a communication device of the party (such as a computer, STB, cellular phone, etc.) to initiate a communication origination request to a communication device of the individual (e.g., office phone). If the party determines that interacting with the individual is not desirable, the party can terminate communications with the metaphor engine 610 without invoking a communication origination request. The metaphor engine 610 in steps 518 and 520 can tailor the presentations of the metaphor expression and disclosure of activities of the individual based on the identity of the party.

Figure 8:
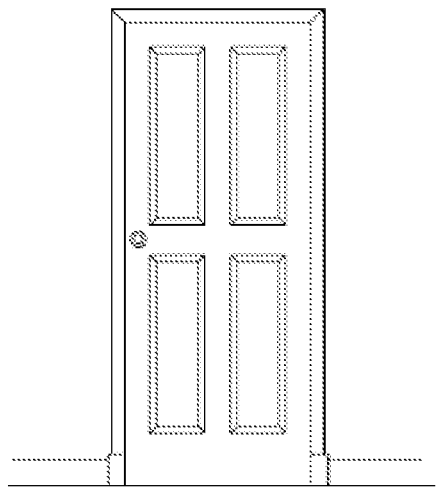
FIGS. 8-9 depict illustrative embodiments of metaphors for describing the individual's mood according to the method of FIG. 6.
Figure 9:
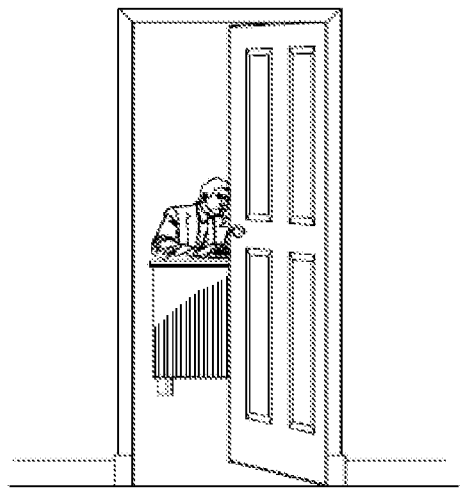

FIGS. 8-9 depict illustrations of metaphor expressions and disclosure techniques that can be employed with the party requesting this information. FIG. 8 illustrates an embodiment of a metaphor expression of the mood of the individual by way of a closed door metaphor. The closed door metaphor can represent a mood of the individual that indicates a lack of availability or receptiveness to interact with the requesting party. Said another way, the closed door can represent a desire of the individual to avoid interactions with the requesting party. In the metaphor expression of FIG. 8 there is no disclosure of the individual's activities. The lack of disclosure can also be interpreted as a desire to avoid interactions with the requesting party.

FIG. 9 illustrates another embodiment of the metaphor expression of the individual's mood by way of a partially opened door metaphor that provides a glance at the activities of the individual. The partially opened door metaphor can represent a degree of receptiveness by the individual to interact with the party that exceeds the receptiveness depicted by the metaphor expression of FIG. 8. The partially opened door metaphor can convey a message to the party that the individual is busy and may not want to be disturbed unless the interaction is important. The disclosure of the individual's activities in the metaphor of FIG. 9 can provide the requesting party additional information as to the receptiveness of the individual to interact with the party. As noted earlier, the disclosure can be presented with a visual and/or audible component which can be actual or a portrayal of what the individual is doing.

In step 522, the negotiation engine 606 can determine a negotiation strategy according to the identification of the party and the context of the activity of the individual. In step 524, the negotiation engine 606 can determine from the negotiation strategy whether negotiations are necessary. The negotiation strategy can for example indicate that based on the identity of the party negotiations are not required (e.g., no negotiations when spouse or boss calls). Accordingly, the party can initiate interactions with the individual in step 536 without intermediate negotiations.

If negotiations are required, the negotiation engine 606 can proceed to step 526 where it determines whether the party persists in interacting with the individual even though the metaphor expression indicates that the individual is not in a mood (or is in a partial mood) to interact with the party such as shown in FIGS. 8-9. Persistence can be detected when the party invokes a communication origination request over the IMS network 250. If persistence is not detected such as a result of the party terminating communications with the metaphor engine 608, the negotiation engine 606 can conclude monitoring the party's actions.

If persistence is detected in step 526, the intermediary engine 608 can be invoked in step 528 by the negotiation engine 606. The intermediary engine 608 can select an intermediary according to the context of activity of the individual and the identity of the party. If for example the party makes a request while the individual is in the midst of an occupational context, the intermediary identified by the synthesis engine 602 might be a receptionist or an administrative assistant. If the context of activity is an entertainment context (such as the individual watching a movie or a football game at home), the intermediary identified might be a butler. The intermediary in these illustrations can be a human agent or virtual agent in the form of an interactive avatar. The human agent can be selected by the intermediary engine 608 by signaling a service center or an actual employee or associate of the individual (such as a receptionist or secretary).

Figure 10:
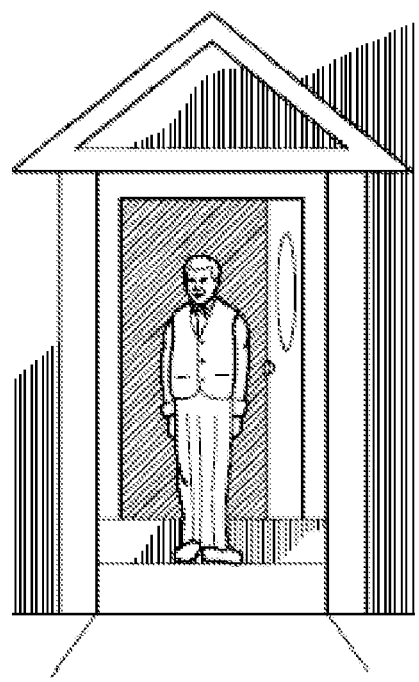
FIG. 10 depicts an illustrative embodiment of an intermediary for negotiating a degree of communication access to the individual according to the method of FIG. 6.

In a case where the intermediary is an interactive avatar, the intermediary engine 608 can represent an avatar engine capable of generating interactive avatars. The avatar engine can use common speech synthesis and computer animation technology to generate in real-time faces and expressions that look like actual people. With recent advances in speech recognition, language interpretation and speech synthesis, conversational interactive avatars can be presented to the party requesting to interact with the individual. FIG. 10 demonstrates an interactive avatar generated by the intermediary engine 608 in the form of a butler. The butler avatar can be presented on a communication device of the party.

The presentation can be visual and audible, or audible only. Audible only presentations can be tailored so that the avatar's speech has the formalities of a butler ("Good afternoon. I am Mr. X's servant. Can I help you?"). The interactive avatar in this illustration can be selected by the synthesis engine 602 when for example the individual is at home entertaining guests. The synthesis engine 602 can of course select other characterizations of the interactive avatar that may be suitable to the context of activity of the individual (e.g., receptionist, administrative assistant, etc.).

In step 530, the intermediary engine 608 can receive instructions from the negotiation engine 606 for directing negotiations between the avatar (e.g., butler) and the party. The responses of the party can be conveyed by the intermediary engine 608 to the negotiation engine 606 in step 532. According to the responses of the party, the negotiation engine 606 can determine at step 534 whether to provide the party access to the individual at step 536, continue negotiations at steps 530-532 by way of the interactive avatar, or terminate communications with the party. If the negotiation engine 606 decides to transition from step 534 to step 536, the degree of access provided to the party may be partial or unlimited.

Suppose for instance, the individual is in the midst of watching a football game. The synthesis engine 602 can determine from the behavioral profile that the individual does not like to engage in voice communications during this time, but has shown an acceptance to engage in instant messaging communications. The behavioral profile can also indicate that the individual will accept voice communications during a football game when the requesting party is a close friend or family and the request is urgent. With this understanding, the negotiation engine 606 can determine in step 534 that providing the party instant messaging access to the individual would be acceptable to the individual, while voice communication would be undesirable if the party did not indicate in the communication exchange with the interactive avatar that the call was urgent.

Other embodiments of method 500 are contemplated by the present disclosure. Accordingly, the reader is directed to the claims section for a fuller understanding of the breadth and scope of the present disclosure.

Figure 11:
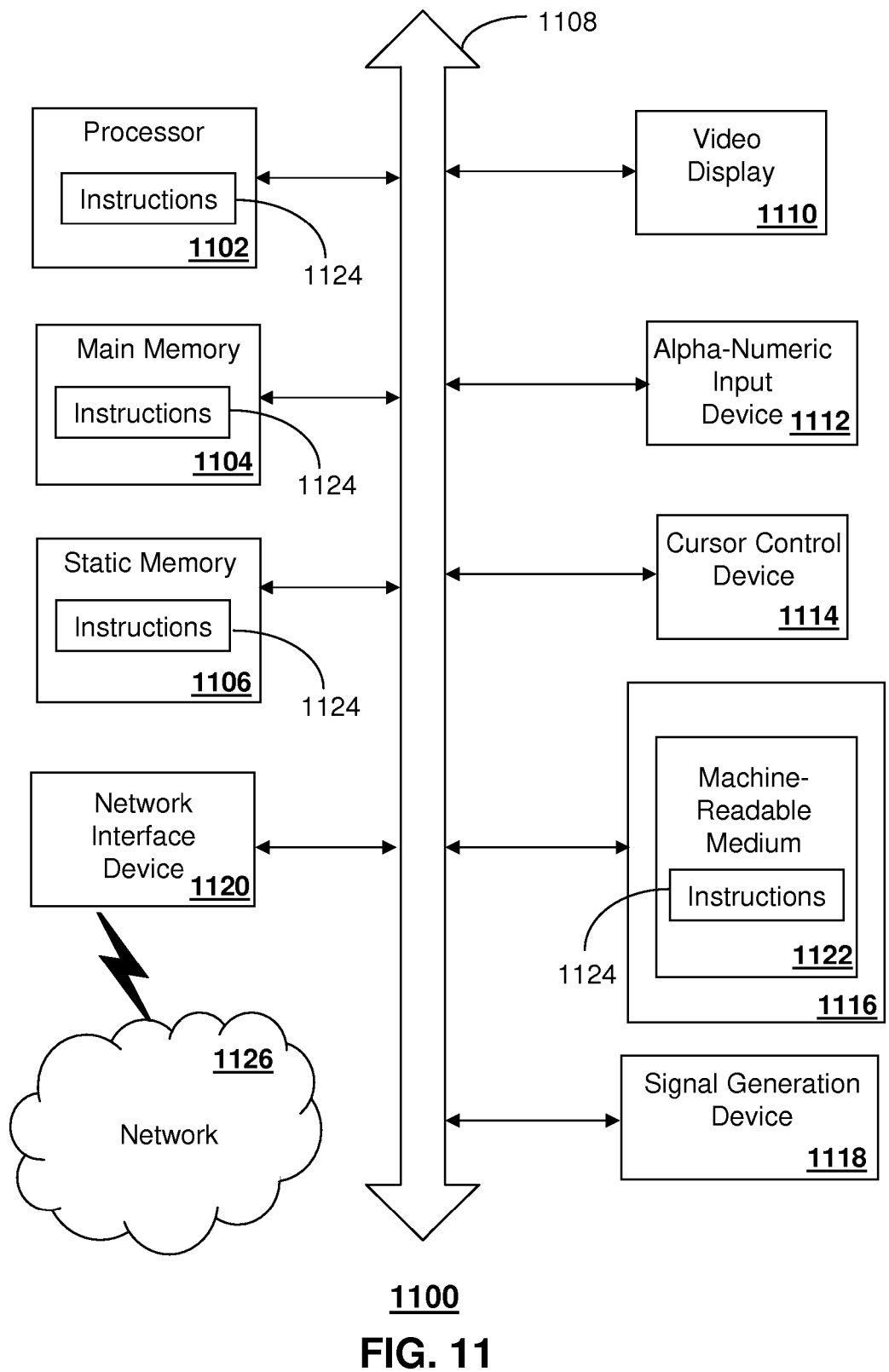
FIG. 11 is a diagrammatic representation of a machine in the form of a computer system within which a set of instructions, when executed, may cause the machine to perform any one or more of the methodologies discussed herein.

FIG. 11 depicts an exemplary diagrammatic representation of a machine in the form of a computer system 1100 within which a set of instructions, when executed, may cause the machine to perform any one or more of the methodologies discussed above. The computer system 1100 in whole or in part can be a representative embodiment of the synthesis engine 602, the collection engine 604, the negotiation engine 606, the intermediary engine 608, and the metaphor engine 610. It is also contemplated that the computer system 1100 in whole or in part can also be a representative embodiment of other devices described in the present disclosure. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both)), a main memory 1104 and a static memory 1106, which communicate with each other via a bus 1108. The computer system 1100 may further include a video display unit 1110 (e.g., a liquid crystal display (LCD), a flat panel, a solid state display, or a cathode ray tube (CRT)). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A synthesis engine, comprising:
    a controller; and
    a storage medium for storing instructions to be executed by the controller;
    wherein the instructions, when executed by the controller, cause the controller to:
    retrieve collected information associated with a behavior of an individual;
    synthesize from the information a measure of a mood of the individual to interact with others, wherein the mood indicates an availability of the individual and a receptiveness of the individual to accept a request to interact with an entity, and wherein the measure has a plurality of dimensions; and
    transmit the measure to a system associated with a communication device of the individual to manage communication requests between the individual and the entity.

2. The synthesis engine of claim 1, wherein the plurality of dimensions comprise at least two of:
    a first dimension to manage a metaphorical expression of the mood of the individual to interact with others;
    a second dimension to manage a disclosure to the entity of one or more activities of the individual;
    a third dimension to manage a negotiation with the entity to provide the entity a degree of access to the individual; and
    a fourth dimension to manage an intermediary that conducts the negotiation with the entity.

3. The synthesis engine of claim 2, wherein the controller is adapted to transmit the first dimension to the system to manage the metaphorical expression presented to the entity expressing an interest to interact with the individual or the system.

4. The synthesis engine of claim 3, wherein the controller is adapted to:
    determine a fifth dimension to manage the metaphorical expression according to an identification of the entity; and
    transmit the fifth dimension to the system.

5. The synthesis engine of claim 2, wherein the controller is adapted to transmit the second dimension to the system to manage the disclosure of the one or more activities of the individual to the entity.

6. The synthesis engine of claim 5, wherein the system presents the entity the disclosure of the one or more activities of the individual according to one of a metaphorical presentation or actual presentation of the one or more activities of the individual.

7. The synthesis engine of claim 6, wherein the system presents the metaphorical presentation or actual presentation of the one or more activities of the individual as part of a presentation of the metaphorical expression of the mood of the individual.

8. The synthesis engine of claim 5, wherein the controller is adapted to:
    determine a fifth dimension to manage the disclosure according to an identification of the entity; and
    transmit the fifth dimension to the system.

9. The synthesis engine of claim 2, wherein the controller is adapted to transmit the third dimension to the system to manage the negotiation with the entity requesting to interact with the individual.

10. The synthesis engine of claim 9, wherein the controller is adapted to:
   determine a fifth dimension to manage the negotiation according to an identification of the entity; and
   transmit the fifth dimension to the system.

11. The synthesis engine of claim 2, wherein the controller is adapted to transmit the fourth dimension to the system to manage the intermediary that conducts the negotiation with the entity.

12. The synthesis engine of claim 11, wherein the controller is adapted to:
   determine a fifth dimension to manage the intermediary according to an identification of the entity; and
   transmit the fifth dimension to the system.

13. The synthesis engine of claim 11, wherein the intermediary corresponds to one of a human being and an interactive avatar controlled by an avatar engine.

14. The synthesis engine of claim 3, wherein the metaphorical expression presented to the entity comprises a visual component, an audible component, or combination thereof.

15. The synthesis engine of claim 5, wherein the disclosure presented to the entity comprises a visual component, an audible component, or combination thereof.

16. The synthesis engine of claim 1, wherein the behavior of the individual is derived from at least one of past or present activities of the individual, and interactions between the individual and others.

17. The synthesis engine of claim 1, wherein the controller is adapted to synthesize from the collected information the measure of the mood of the individual according to one or more degrees of importance given to one or more aspects of the collected information.

18. The synthesis engine of claim 1, wherein the collected information is supplied by a collection engine, and wherein the collection engine monitors activities of the individual from at least one of a wireless phone, a wireline phone, a computer, a set-top box, a sensor, and a gaming console, each operating in one or more communication systems.

19. The synthesis engine of claim 18, wherein the collection engine further monitors activities of the individual from one or more network elements of the one or more communication systems, wherein the one or more communication systems comprise at least one of an Internet Protocol Television (IPTV) communication system, a cable TV communication system, a satellite TV communication system, an IP Multimedia Subsystem (IMS) communication system, a fixed-line circuit-switched communication system, a cellular communication system, and an Internet Service Provider (ISP) communication system.

20. The synthesis engine of claim 1, wherein the controller is adapted to synthesize from the collected information at least one of:
   a context of activity of the individual;
   a location of the individual;
   a state of usage of each of one or more communication devices or computing devices of the individual; and
   a behavioral profile of the individual.

21. The synthesis engine of claim 20, wherein the controller is adapted to synthesize the measure of the mood of the individual from at least one of the context of activity of individual, the location of the individual, the state of usage of each of one or more communication devices or computing devices of the individual, and the behavioral profile of the individual.

22. The synthesis engine of claim 20, wherein the context of activity comprises at least one of an entertainment context, an occupational context, and a privacy context.

23. The synthesis engine of claim 20, wherein the controller is adapted to:
   detect activities of the individual across a plurality of communication networks operating according to disparate communication protocols; and
   synthesize the behavioral profile of the individual according to the detected activities across the plurality of communication networks.

24. The synthesis engine of claim 1, wherein the controller is adapted to:
   present the individual the synthesized measure of the mood of the individual;
   receive from the individual at least one of a qualitative or quantitative adjustment to the measure of the mood of the individual; and
   transmit an adjusted measure of the mood of the individual to the system.

25. The synthesis engine of claim 1, wherein the system comprises one of a metaphor engine for presenting to the entity an expression of the mood of the individual or a disclosure of one or more activities of the individual, a negotiation engine to negotiate with the entity a degree of access to the individual, and an intermediary to conduct the negotiation with the entity as directed by the negotiation engine.

26. The synthesis engine of claim 1, wherein the entity comprises one of a human being or an artificial intelligence machine requesting to interact with the individual.

27. A computer-readable storage medium, comprising computer instructions for:
   receiving a collection of information associated with an individual;
   synthesizing from the information a measure of a mood of the individual to interact with others, wherein the measure has a plurality of dimensions; and
   transmitting the measure to a system associated with the individual to manage requests between the individual and an entity.

28. The storage medium of claim 27, wherein the mood indicates a receptiveness for the individual to accept a request from the entity to interact.

29. The storage medium of claim 27, wherein the plurality of dimensions comprise at least two of:
   a first dimension to manage a metaphorical expression of the mood of the individual;
   a second dimension to manage a disclosure to the entity of one or more activities of the individual;
   a third dimension to manage a negotiation with the entity to provide the entity a degree of access to the individual; and
   a fourth dimension to manage an intermediary that conducts the negotiation with the entity.

30. The storage medium of claim 29, comprising computer instructions for adjusting the plurality of dimensions according to at least one of an identification of the entity expressing an interest to interact with the individual, and a context of environment of the individual.

31. The storage medium of claim 27, wherein the collected information comprises at least one of past and present activities of the individual, and interaction activities between the individual and others.

32. The storage medium of claim 27, comprising computer instructions for determining from the collected information at least one of:
- a context of activity of the individual;
- a location of the individual;
- a state of usage of each of one or more communication devices or computing devices of the individual; and
- a behavioral profile of the individual.

33. The storage medium of claim 32, comprising computer instructions for synthesizing the measure of the mood of the individual from at least one of the context of activity of individual, the location of the individual, the state of usage of each of one or more communication devices or computing devices of the individual, and the behavioral profile of the individual.

34. A method, comprising:
- synthesizing from collected information associated with an individual a measure of a mood of the individual to interact with an entity, wherein the measure has a plurality of dimensions; and
- transmitting to a system the measure of the mood of the individual to manage requests of an entity to interact with the individual.

* * * * *